US005845746A

United States Patent [19]

Henrickson et al.

[11] Patent Number: 5,845,746

[45] Date of Patent: Dec. 8, 1998

[54] WHEELCHAIR DYNAMIC BRAKING SYSTEM

[76] Inventors: Sarah E. Henrickson, 6617 Westmoreland Ave., Takoma Park, Md. 20912; Benjamin G. Conaway, 16117 Llewellyn Manor Way, Silver Spring, Md. 20905; Rakhi Goel, 14717 Soft Wind Dr., North Potomac, Md. 20878

[21] Appl. No.: 764,169

[22] Filed: Dec. 13, 1996

[51] Int. Cl.[6] ................................ B62M 1/14; B60T 1/06

[52] U.S. Cl. ................................ 188/2 F; 188/17; 188/26; 188/30; 188/31; 188/177; 188/139; 188/82.1; 188/82.3; 188/114; 280/250.1

[58] Field of Search ............................ 188/2 F, 174–179, 188/20, 24.18, 265, 353, 30–31, 69, 60, 61, 26, 17, 19, 21, 23, 110, 114, 82.3, 135, 139, 82.1, 82.4, 87.8, 87.7, 134; 280/250.1, 304.1, 271, 282; 303/24.1, 9.67, 9.68; 192/6 R, 7, 13 R, 13 A; 477/186, 195

[56] References Cited

U.S. PATENT DOCUMENTS

| | | | |
|---|---|---|---|
| 324,081 | 8/1885 | Cartmell et al. | 188/139 |
| 347,872 | 8/1886 | Ferguson | 188/177 |
| 673,215 | 4/1901 | Miller | 188/139 |
| 959,279 | 5/1910 | Whitcomb | 188/177 |
| 4,538,825 | 9/1985 | Delahoussaye et al. | 188/82.3 |
| 4,733,755 | 3/1988 | Manning | 188/31 |
| 5,301,971 | 4/1994 | Breretos et al. | 188/2 F |

FOREIGN PATENT DOCUMENTS

| | | | |
|---|---|---|---|
| 113678 | 2/1926 | Switzerland | 188/30 |
| 198372 | 3/1924 | United Kingdom | 188/30 |

*Primary Examiner*—Douglas C. Butler
*Attorney, Agent, or Firm*—Richard L. Huff

[57] ABSTRACT

An automatic braking system for wheelchairs which prevents rearward, downhill motion of wheelchairs while having no effect on horizontal or uphill motion. The braking system is made up of circular ratcheted plates which are attached to the axles of the driving wheels of the wheelchair and L-shaped members slightly in front of and beneath the ratcheted. The L-shaped members are rotatable about axles located in their angles. The long leg of an L-shaped member is directed downwardly by gravity and maintains the short leg in a substantially horizontal position. The short leg forms a pawl which engages the ratchets of the plate when the wheels start to roll backwards when the wheelchair is directed upwardly, thus automatically stopping the wheelchair.

1 Claim, 4 Drawing Sheets

WHEELCHAIR DYNAMIC BRAKING SYSTEM

BACKGROUND OF THE INVENTION

1. Field of the Invention

This invention is directed to an automatic braking system for wheelchairs which prevents unwanted rearward motion on inclines.

2. Description of the Related Art

With the passage of the Americans With Disabilities Act (ADA) of 1990, The United States acknowledged the needs of disabled Americans. A principal provision of the ADA is mandatory wheelchair accessibility to private businesses. To comply with this law, many businesses have built steep ramps to fit in close quarters. While these businesses are technically accessible, many of the one million wheelchair users in the United States are not able to climb the ramps without assistance as the wheelchairs tend to roll backwards. Thus the intent of the ADA is defeated.

The prior art is aware of braking systems which are designed to prevent the rearward motion of wheelchairs on inclines, as see U.S. Pat. No. 3,556,260 to Meyer, U.S. Pat. No. 4,101,143. to Sieber, U.S. Pat. No. 4,538,825 to Delahoussaye et al, U.S. Pat. No. 4,560,033 to DeWoody et al, U.S. Pat. No. 4,762,332 to Seol, U.S. Pat. No. 4,887,830 to Fought et al, and U.S. Pat. No. 4,987,978 to Jungersen. The systems disclosed in these patents have drawbacks in that either the braking devices are not automatic and must be operated by the wheelchair user while engaged in maneuvering up an incline or the braking devices are not limited to inclines, but prevent backward motion under all circumstances unless disengaged by the user.

SUMMARY OF THE INVENTION

The present invention is designed to overcome these drawbacks and present a fully automatic braking system which will engage whenever a wheelchair on an upward incline starts to roll backward. Forward motion is permitted regardless of inclination of the surface. Rearward motion is not interfered with when the wheelchair is on a level surface or is facing downwardly. Thus, the braking system of the present invention engages automatically and only when it is needed.

The system of the present invention contains two components. The first is a pair of ratcheted plates mounted on the hubs of the driving wheels. The ratchets are placed at such an angle so as to permit forward motion when connected with the pawls, but to not permit rearward motion. The second component is an L-shaped member having a long leg and a short leg being joined at the angle. This member is rotatable about an axle located at the angle. Because of its greater weight, the long leg maintains a nearly vertical position, keeping the short leg in a nearly horizontal position. The short leg ends in a pawl and is so situated and shaped as to engage with the ratcheted plate when the wheelchair is on an upward incline. When thus automatically engaged, the wheelchair cannot roll backwards down an incline

DESCRIPTION OF THE PREFERRED EMBODIMENTS

Figure 1:
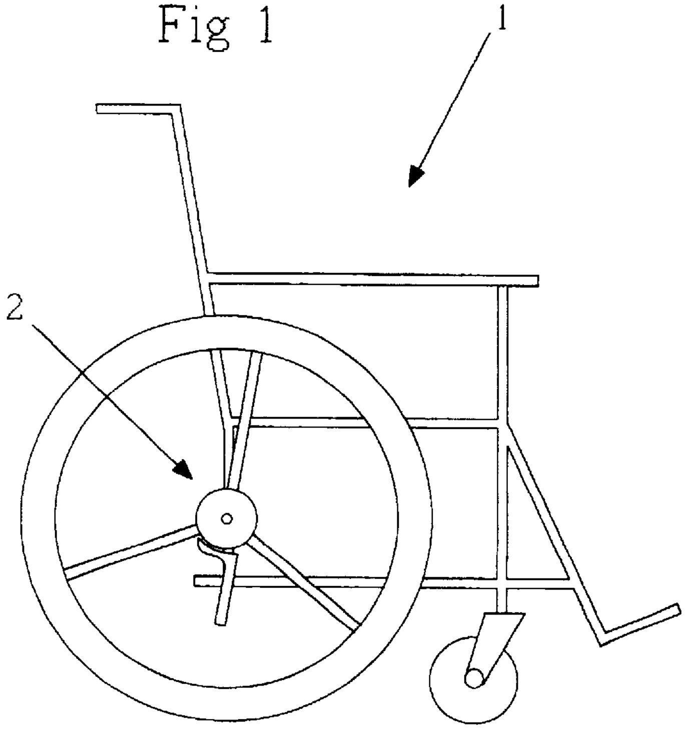
FIG. 1 is a side elevational view showing a wheelchair having the braking system of the present invention.
Figure 2:
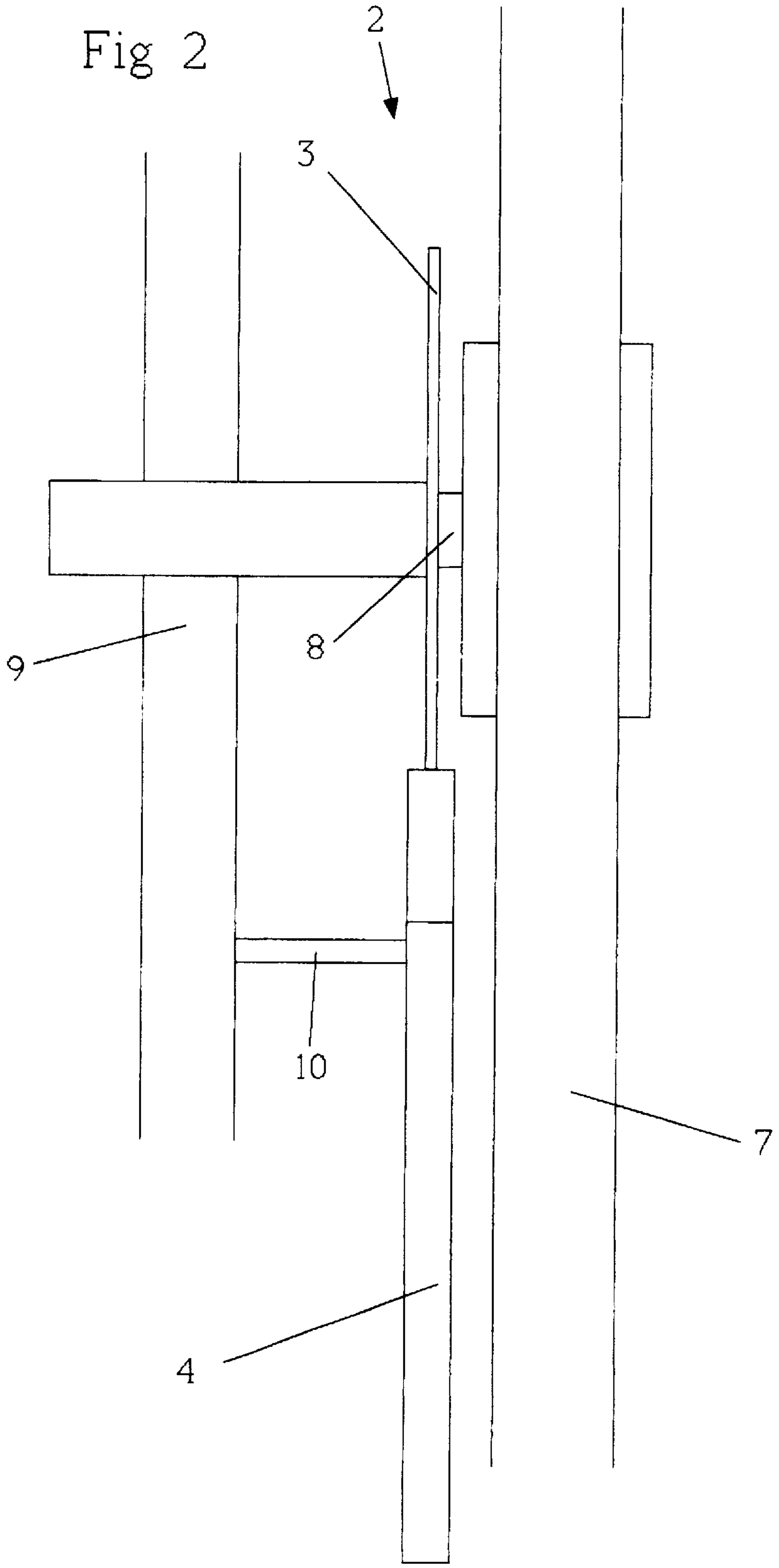
FIG. 2 is a front elevational view of the braking system of the present invention.
Figure 3:
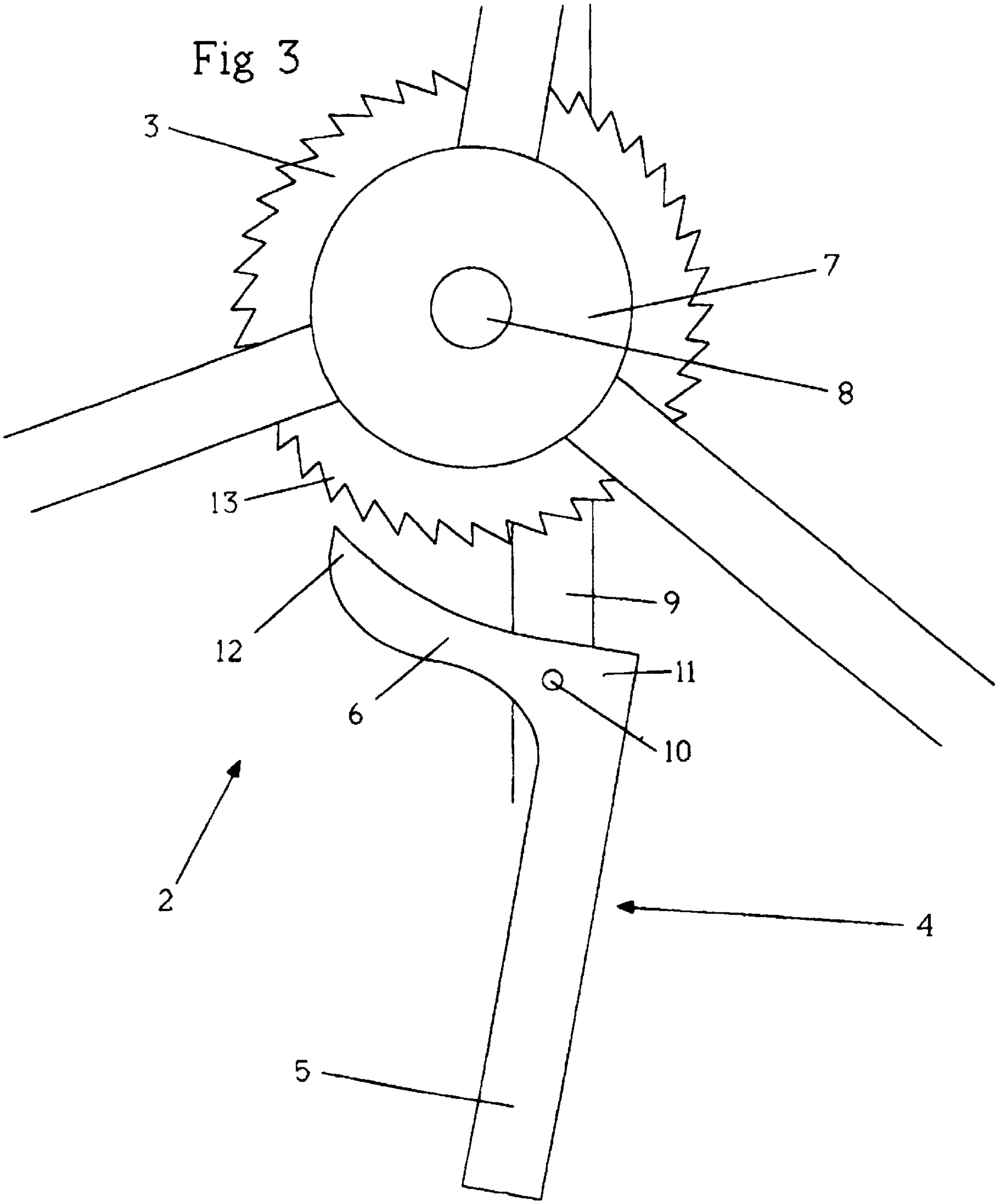
FIG. 3 is a side elevational view of the braking system of the present invention in the disengaged position.
Figure 4:
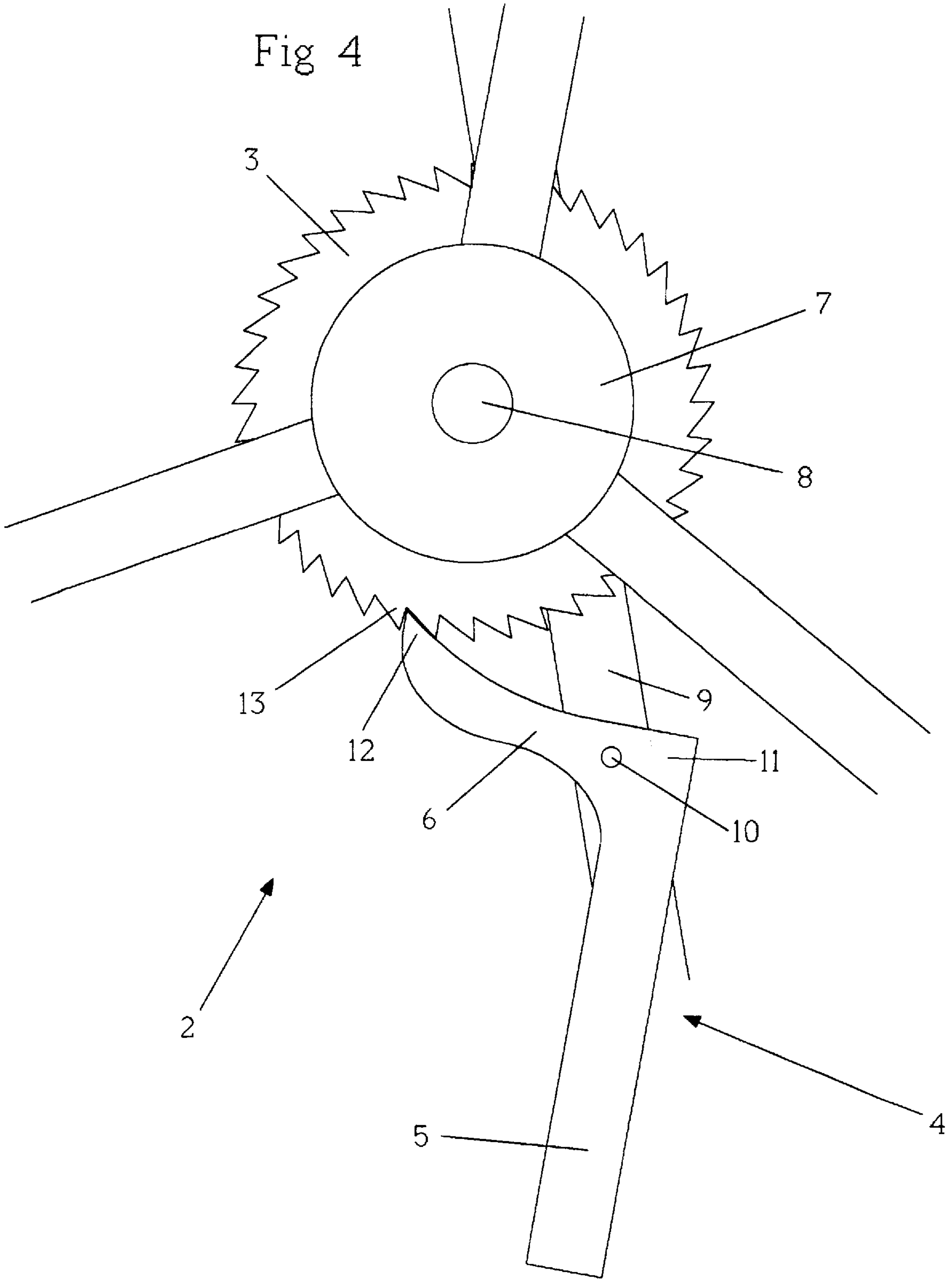
FIG. 4 is a side elevational view of the braking system in the engaged position.

The present invention will now be described with reference to the above drawing, wherein like numbers refer to like features throughout.

The present invention comprises a combination of a wheelchair 1 with an automatic braking system 2. The automatic braking system 2 is made up of at least one circular ratcheted plate 3 and corresponding L-shaped members 4 having a long leg 5 and a short leg 6. The circular ratcheted plates 3 are attached to the inner surfaces of the driving wheels 7 so that the axle 8 of the wheels 7 corresponds with the axle 8 of the circular ratcheted plates 3. A preferred mode of attachment is with nuts and bolts passing through holes drilled through the circular ratcheted plates 3 and being attached to the wheel 7. The size of the circular ratcheted plates 3 is not critical, but a diameter of three inches has been found to be preferable.

The L-shaped members 4 are attached to the frame 9 of the wheelchair 1 by fixedly inserting axes 10 in the desired location and rotatably mounting the L-shaped members 4 on the axes 10 at the angles 11 of the L-shaped members 4. The long arm 5 of an L-shaped member 4 is much larger and heavier than the short arm 6. Therefore, the L-shaped members 4 are constantly held by gravity in a position wherein the long arms 5 are nearly vertical and the short arms 6 are nearly horizontal. The short arms 6 are preferably slightly curved and tapered to form pawls 12 which are adapted to fit into the ratchets 13. The axes 10 for the L-shaped members 4 are mounted slightly vertically offset from the axle 8 for the circular ratcheted plates 3 and are located below the ratchets 13.

In the above position, the pawls 12 will not contact the ratchets 13 when the wheelchair 1 is horizontal or pointed downwardly. When the wheelchair 1 is pointed upwardly, the circular ratcheted plates 3 will tip downwardly and contact the pawls 12. If the wheelchair 1 is moving forwardly while inclined upwardly, the pawls 12 will simply ride over the ratchets 13. If the wheelchair 1 begins to roll backward while inclined upwardly, the pawls 12 will engage the ratchets 13 and cause the wheelchair 1 to stop rolling. This allows the user to rest while on an upward incline. After strength is regained, the user may then proceed as usual.

We claim:

1. In a hand-powered wheelchair having forward and rearward aspects and containing a frame and driving wheels having at least one axle, the improvement comprising:

(a) at least one circular plate having ratchets mounted on the axle of at least one driving wheel and (b) at least one L-shaped member having a long leg and a short leg joined at an angle and being rotatably mounted on an axis which is located at the angle and is attached to the frame of the wheelchair, which angle being beneath and forward of the axle of the corresponding driving wheel, thus allowing rotation of the L-shaped member about its axis; the long leg of the L-shaped member remaining in a position slightly removed from vertical because of the pull of gravity on the weight of the long leg; the short leg of the L-shaped member is directed rearwardly and forms a pawl which fits within the ratchets of the circular ratcheted plate; the circular ratcheted plate and the L-shaped member being so arranged so that when the wheelchair is directed horizontally or downwardly, the ratchets of the circular ratcheted plate do not contact the pawl of the L-shaped member, but when the wheelchair is directed upwardly, the ratchets of the circular ratcheted plate contact the pawl of the L-shaped member so that when the wheelchair is moving forward, the pawl rides over the ratchets and when the wheelchair begins moving backward, the pawl engages the ratchets and prevents backward movement of the wheelchair.

* * * * *